United States Patent [19]
Lee

[11] Patent Number: 5,857,045
[45] Date of Patent: Jan. 5, 1999

[54] SPLICER FOR LIGHT WAVEGUIDES

[75] Inventor: Ho-Kyung Lee, Incheon, Rep. of Korea

[73] Assignee: Daewoo Telecom Ltd., Incheon, Rep. of Korea

[21] Appl. No.: 853,932

[22] Filed: May 9, 1997

[30] Foreign Application Priority Data

May 9, 1996 [KR] Rep. of Korea ....................... 96-15264
Oct. 11, 1996 [KR] Rep. of Korea ....................... 96-45341

[51] Int. Cl.$^6$ ................................................ G02B 6/38
[52] U.S. Cl. ............................................ 385/70; 385/135
[58] Field of Search ................................ 385/130–140, 385/147

[56] References Cited

U.S. PATENT DOCUMENTS

| | | | |
|---|---|---|---|
| 4,850,671 | 7/1989 | Finzel | 385/69 |
| 5,121,456 | 6/1992 | Essert et al. | 385/70 |
| 5,195,152 | 3/1993 | Finzel | 385/70 |
| 5,201,019 | 4/1993 | Gallasser et al. | 385/99 |
| 5,274,729 | 12/1993 | King et al. | 385/134 |
| 5,367,594 | 11/1994 | Essert et al. | |
| 5,394,496 | 2/1995 | Caldwell et al. | |
| 5,440,657 | 8/1995 | Essert | |
| 5,450,517 | 9/1995 | Essert | |

*Primary Examiner*—Akm E. Ullah
*Attorney, Agent, or Firm*—Notaro & Michalos P.C.

[57] ABSTRACT

A splicer for light waveguides is disclosed, including a receptacle including a first body of a predetermined length, having first recesses cut lengthwise through the center of the contact surface, and a second body of length the same as that of the first body, having second recesses cut lengthwise through the center of the surface corresponding to the first recesses cut through the first body; expanding means for expanding space separating the first and second bodies in order to easily insert light waveguides into the recesses; and bending means surrounding the receptacle's outer surface that securely hold first and second bodies together and provide the necessary clamping force.

20 Claims, 13 Drawing Sheets

SPLICER FOR LIGHT WAVEGUIDES

BACKGROUND OF THE INVENTION

1. Field of the Invention

The present invention relates to a splicer for connecting light waveguides. More particularly, it relates to a splicer for connecting light waveguides that provides double clamping.

2. Discussion of Related Art

A communications network, constructed with light waveguides, needs splicing of fiber optic cable under certain circumstances. The methods of extending light waveguides includes fusion splicing and mechanical splicing technics. According to the mechanical splicing technique, two optical fibers are mechanically joined to each other by making cores of two fibers meet in a V-shaped centering groove. In contrast with fusion splicing techniques, this mechanical splicing technique does not employ electric power, and can be easily carried out in the field. Since a conventional splicer for light waveguides does not clamp coated or jacketed light waveguide regions effectively, stress concentrates on cladded regions, thus easily breaking the fiber optic filament. To prevent breakage of the optical fiber, it is necessary to clamp and hold outer layers of a jacket so that the stress applied to the fiber optic cable is not directly applied to the cladded regions.

A conventional splicer for fiber optic cable is disclosed in U.S. Pat. No. 4,850,671. Japanese Patent Application No. 89-174977 (filed on Jul. 6, 1989) has proposed a splicer for fiber optic cable having the clamping function. In the conventional splicer, a cover plate is laid on a base plate while light waveguides are tuned therein, and the cladded and jacketed filaments of the light waveguides are clamped simultaneously. When the cover plate is laid on the base plate, the connecting condition of the light waveguides may vary. Whenever the connecting condition of the light waveguides inserted into the splicer is inferior, there are problems tuning the light waveguides again after disassembling the splicer. Thus, according to more effective tuning mechanism, the cladded or jacketed fiber optic elements are first clamped, before the remaining parts of the fiber optic cable are clamped.

SUMMARY OF THE INVENTION

Accordingly, the present invention is directed to a splicer for light waveguides that substantially obviates one or more of the problems, limitations, and disadvantages of the related art.

It is the first objective of the present invention to create a splicer for light waveguides which facilitates tuning of the light waveguides that are connected to each other by first clamping cladded or coated fiber optic filaments and then clamping the rest of the fiber optic filaments.

It is the second objective of the present invention to provide a splicer for light waveguides having an opening to see if the light waveguides are correctly tuned in its V-shaped groove, with the naked eye.

It is the third objective of the present invention to provide a splicer for light waveguides which can expand recesses of its receptacle accepting and retaining the light waveguides for the purpose of facilitating the insertion or removal of the light waveguides.

It is the fourth objective of the present invention to provide a splicer for light waveguides which may perform the tuning operation promptly and exactly.

It is the fifth objective of the present invention to provide a splicer for light waveguides to connect fiber optic cables to each other without trouble of disassembling the splicer.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, there is disclosed a splicer for light waveguides including a receptacle having a first body of a predetermined length, having first recesses cut lengthwise through the center of the contact surface, and a second body of length the same as that of the first body, having second recesses cut lengthwise through the center of the surface corresponding to the first recesses cut through the first body; expanding means for expanding space separating the first and second bodies in order to easily insert light waveguides into the recesses; and bending means surrounding the receptacle's outer surface that securely hold first and second bodies together and provide the necessary clamping force.

According to the first aspect of the present invention, it is easy to insert or remove the light waveguides into or from the recesses after expanding the recesses by the use of the expanding means, without trouble of disassembling the splicer. According to the second aspect of the present invention, a splicer for light waveguides includes a receptacle with a first body of a predetermined length, having recesses cut lengthwise through middle of the contact surface, and an opening right over the middle of the recesses and a second body with the same length as the first body, having the corresponding recesses cut in its contact surface to match with the first body, and a V-shaped groove between the recesses which is coaxial; a gripper inserted into the opening, and having the corresponding V-shaped groove that will mate with the V-shaped groove in the second body; pressure means pressing the gripper into the opening; elastic means for pushing the gripper out of the receptacle; bending means for keeping the respective channels of the first and second bodies mated with each other; and expanding means for separating the first body from the second body so as to facilitate the insertion of the light waveguides.

According to the second aspect of the present invention, a user can check the connecting state of the light waveguides with the naked eye via the through opening, thus providing more efficient clamping operation.

According to the third aspect of the present invention, a splicer for light waveguides includes: a receptacle including a second body, formed of a base plate of rectangular section, having recesses with a V-shaped groove cut lengthwise therebetween, and a first body having a tuning member contacting the second body, having an opening positioned perpendicular to the contact surface of the tuning member and the second body, and clamping adjacent to both sides of the tuning member, each having the same section as the tuning member's, and recesses formed on its surface contacting the second body; a gripper that is inserted into the opening, and having another V-shaped groove corresponding to the first recesses; pressure means pressing the gripper into the opening; elastic means for pushing the gripper out of the receptacle; bending means having an opening that communicates with the through opening, and used to keep the respective recesses of the first and second bodies matching with each other; and expanding means for expanding the space between the first body and the second body, so as to facilitate the insertion of the light waveguides.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention that together with the description serve to explain the principles of the drawings:

DETAILED DESCRIPTION OF PREFERRED EMBODIMENT

Reference will now be made in detail to the preferred embodiments of the present invention, examples of which are illustrated in the accompanying drawings.

[First preferred embodiment]

Figure 1:
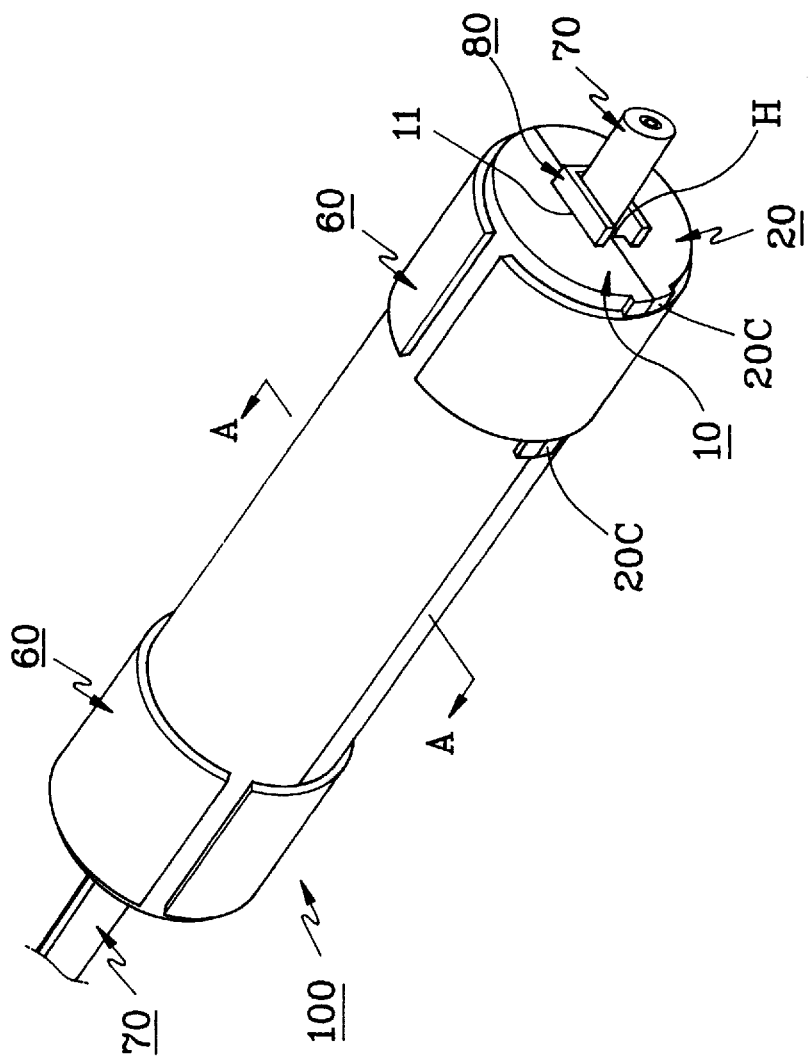
FIG. 1 is a perspective of a splicer for light waveguides in accordance with a first preferred embodiment of the present invention.

FIG. 1 is a perspective view of a splicer for light waveguides in accordance with a first preferred embodiment of the present invention. Reference numerals 10 and 20 denote first and second bodies forming a receptacle 100. Reference numeral 60 corresponds to bending means that are formed around receptacle 100 to hold first and second bodies 10 and 20 together. Reference numeral 80 designates expanding means for expanding the space between first and second bodies 10 and 20, into which light waveguides 70 is inserted, by holding the first and second bodies 10 and 20 apart from each other.

Figure 2:
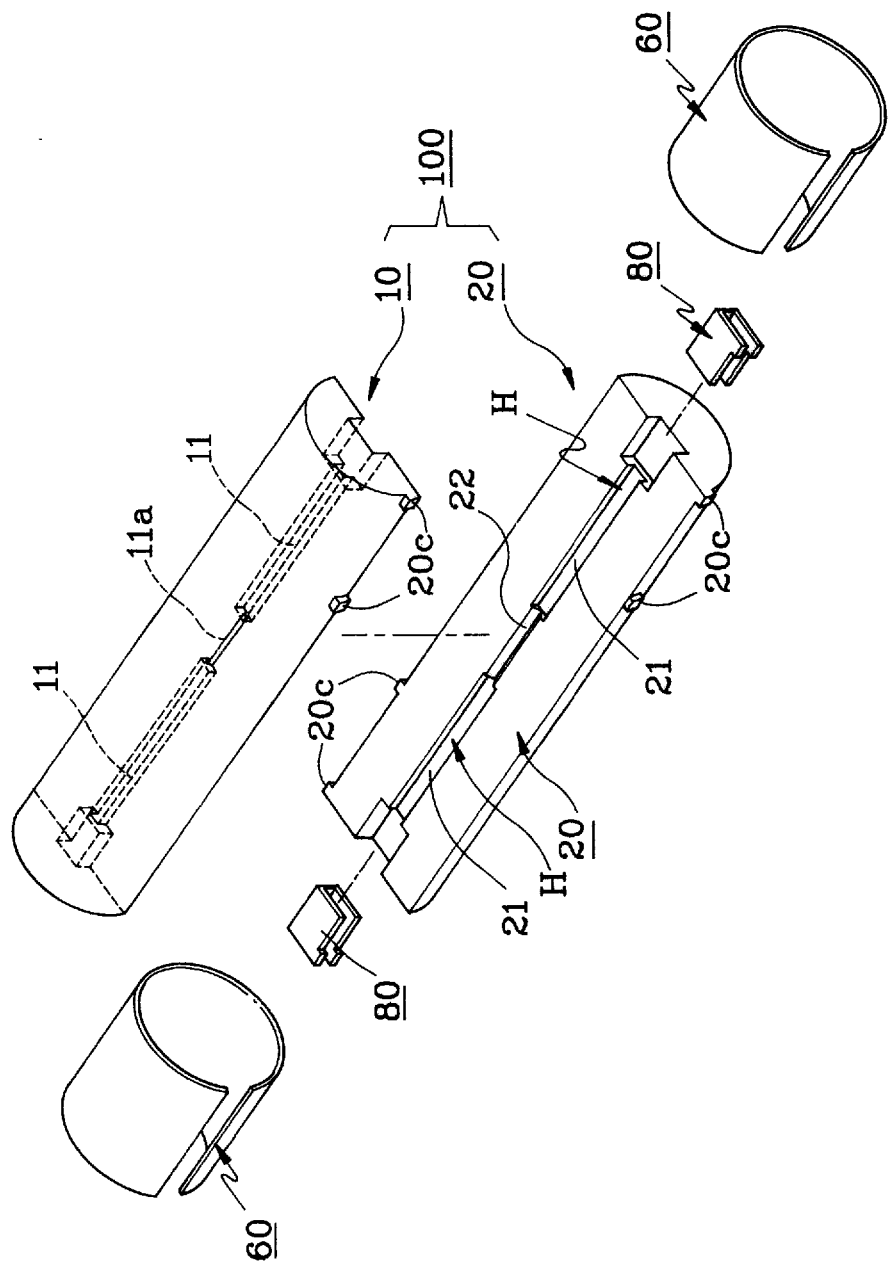
FIG. 2 is an exploded perspective of the splicer for light waveguides of FIG. 1.

As shown in FIG. 2, first body 10 and second body 20 forming receptacle 100 each have recesses 11 and 21, cut lengthwise on their contact surfaces. Recesses 11 and 21 form a hole H when first and second bodies 10 and 20 are held together on the outside. Hole H has a V-shaped groove 22 in which cladded regions of light waveguides 70 are inserted, on the middle of recesses 21. V-shaped groove 22 is cut coaxial with recesses 21, and connects both recesses 21 to each other. Coated light waveguide regions are inserted in recesses 11 and 21, and V-shaped groove 22 is a space where cladded layers of light waveguides 70 are placed.

Figure 12:
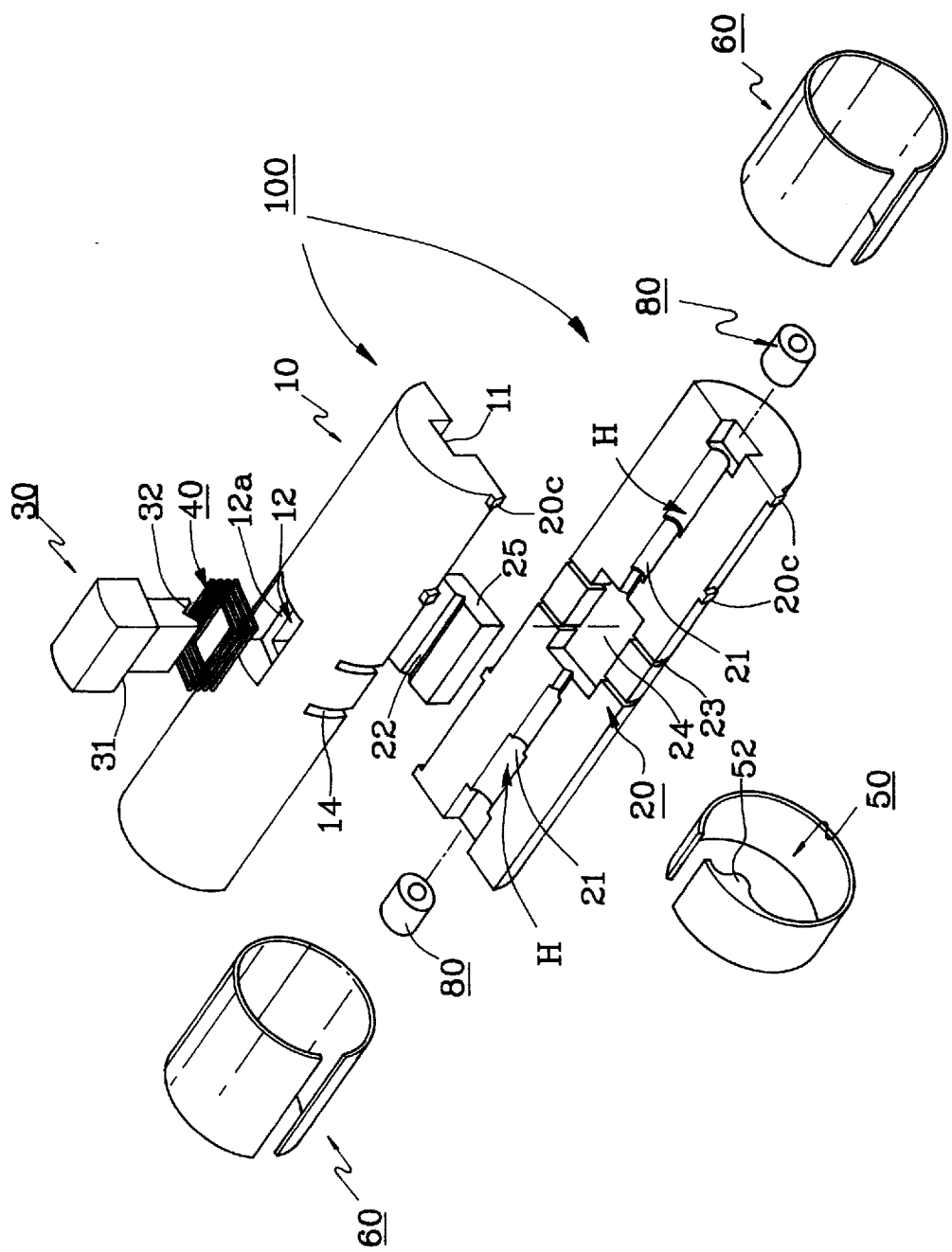
FIG. 12 is an exploded perspective view of a splicer for light waveguides of FIG. 11.

FIGS. 2, 5, 9 and 12 illustrate modified embodiments of recesses 11 and 21, respectively. Respective recesses 11 and 21 may be formed in a straight line or in tiers. If recesses 11 and 21 are arranged in tiers, light waveguides 70 are stripped in the order of core layers, cladded layers, coated layers or jackets, and their exposed parts are then inserted into multi-stage holes H, both light waveguides 70 are joined together in each multi-stage hole H. It is preferable that each of the multi-stage recesses or holes H is of diameter a little smaller than the diameter of each of fiber optic core layers, cladded layers, coated layers, or jackets of light waveguides 70. The layers of light waveguides 70 are stripped so as to correspond to the multi-stage holes of V-shaped groove 22. Recesses 11 and 21 may be formed in a V-shape or rectangular shape, as shown in FIG. 2 or 6, or in a semicircular shape as shown in FIG. 12.

First and second bodies 10 and 20 are each of semicircular shape and form a circle in section when they are held together. Receptacle 100 may be of rectangular or polygonal section, and it is preferable that receptacle 100 is of circular section so as to uniformly press the outer circumference of the light waveguides that are inserted into recesses 11 and 21. That is because the light waveguides may be removed from receptacle 100 if elastic force that holds it, the bending means does not uniformly act on the outer circumference of the light waveguides.

First and second bodies 10 and 20 are of predetermined length, and made of synthetic resin such as polyethylene or polypropylene. It is preferable that first and second bodies 10 and 20 are made of ceramic. First and second bodies 10 and 20, each have a pair of protruding pins 20c spaced a predetermined distance away from each other on their surfaces.

Figure 3:
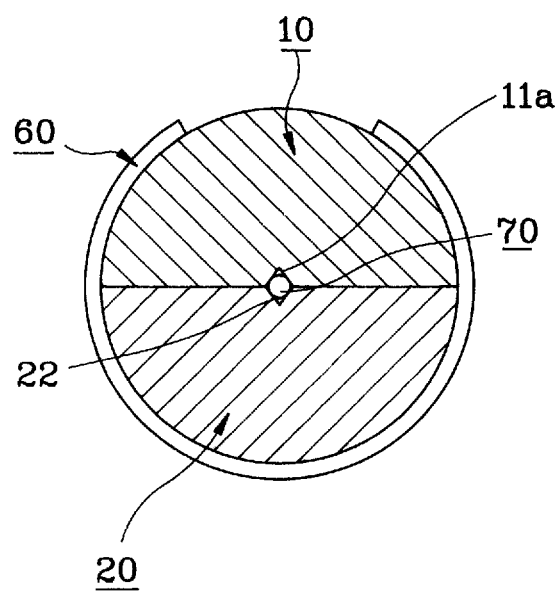
FIG. 3 is a section taken along line A—A of FIG. 1.

The bending means are used to provide clamping force so as to keep first and second bodies 10 and 20 in contact. As shown in FIG. 3, the bending means provide the force for retaining the cladded and jacketed light waveguide regions, inserted into recesses 11 and 21, simultaneously while surrounding them.

The bending means are made of metal, as shown in FIGS. 1 to 3 by way of an example of a preferred application of the bending means, each has a slot extending in the length direction of first or second body 10 or 20. Each bending means includes a ring 60 having elasticity acting for inward in the radial direction. The following description relates to the step of attaching ring 60 to receptacle 100. The slot of ring 60 is first slid to pins 20c, and ring 60 is moved in the length direction of receptacle 100 so that receptacle 100 is closely inserted into ring 60. As ring 60 that fits over receptacle 100 is rotated around receptacle 100, the edges of ring 60 contact pins 20c thereby preventing ring 60's dislocation. Respective rings 60 are located between pairs of pins 20c, and even if outside pressure acts on first and second bodies 10 and 20 in the length direction, the contact surface between first and second bodies 10 and 20 is restrained by pins 20c so that the tuning state of light waveguides 70 is maintained, not being deformed in the axial direction.

An expanding means is used to facilitate insertion or removal of light waveguides 70 by enlarging the diameter of recesses 11 and 21. As shown in FIGS. 1 and 2, keys 80 are inserted into the openings of holes H. Keys 80 includes an empty space through which light waveguides 70 pass, and major and minor axes.

Figure 8:
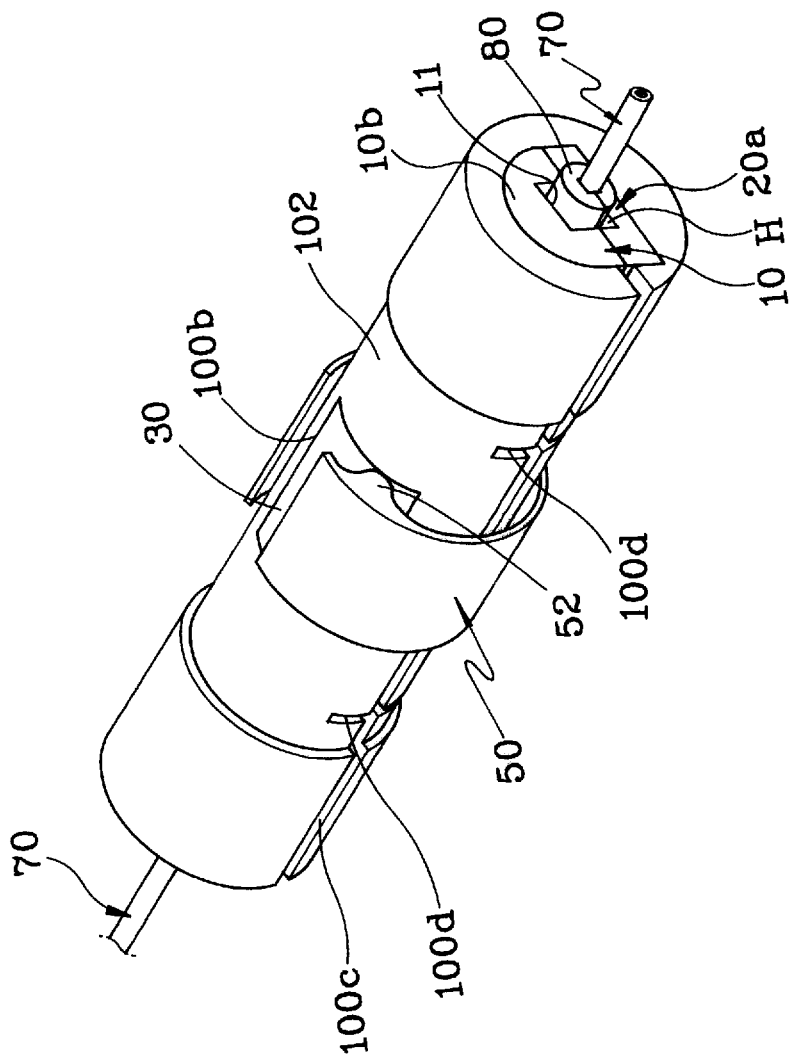
FIG. 8 is a perspective view of the splicer for light waveguides with a third embodiment of the present invention.
Figure 9:
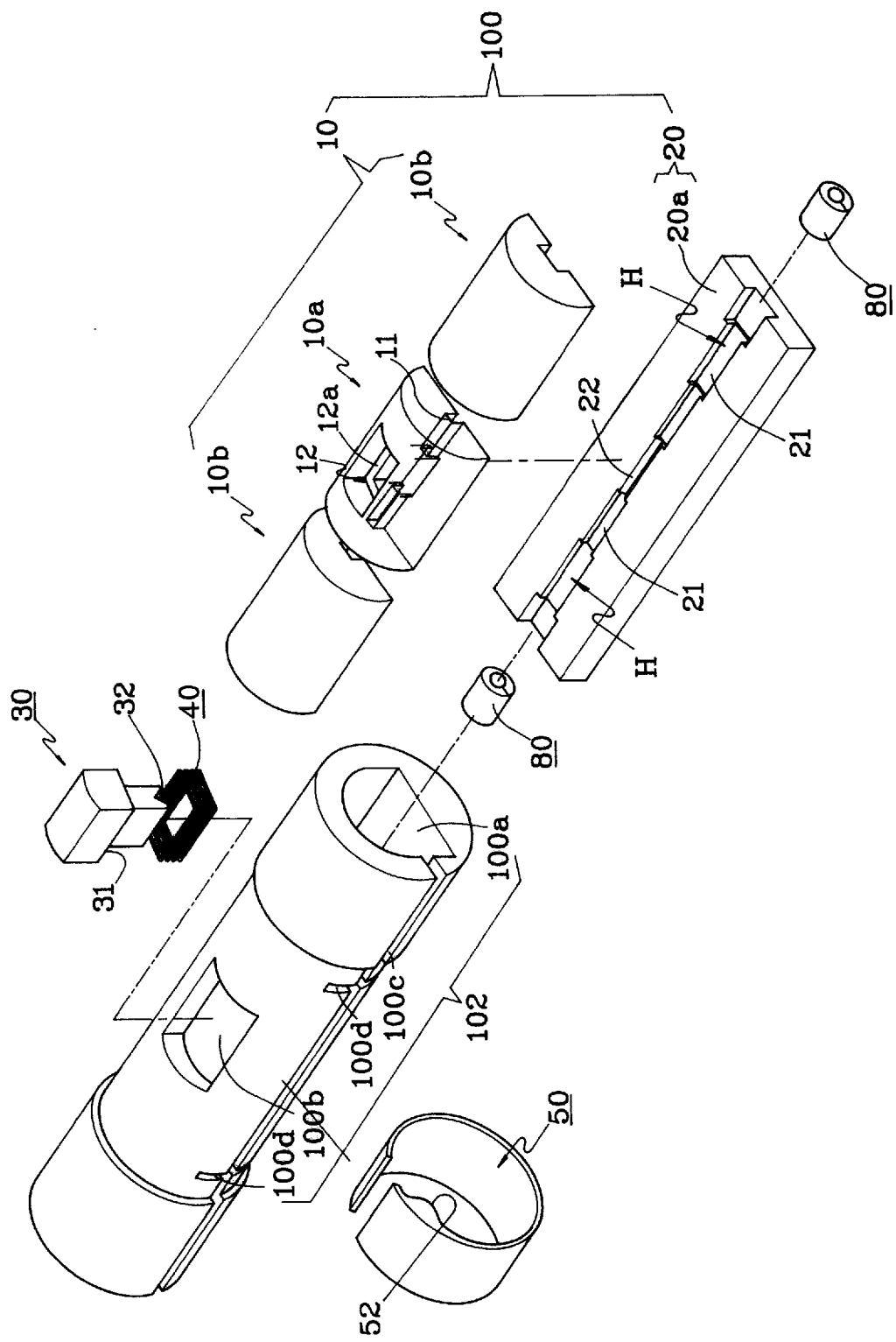
FIG. 9 is an exploded perspective view of a splicer for light waveguides of FIG. 8.

When key 80's major axis is turned perpendicular to recesses 11 and 21 by rotating 90°, first body 10 is spaced away from second body 20. Recesses 11 and 21 are also spaced away from each other, thus enlarging the diameter of each of holes H. As described above, as the diameter of the respective recesses 11 and 21 increases, it is easy to insert or remove light waveguides 70 into or from recesses 11 and 21. It is also possible to employ a hollow key through which light waveguides can pass, and which has an oval section, as depicted in FIGS. 8 and 9. Of course, the entrance of hole H is designed to accept key 80.

After expanding recesses 11 and 21, light waveguides 70 are inserted into recesses 11 and 21, and their cladded optical filament cores are joined together in V-shaped groove 22. According to the more convenient way, if key 80 is turned to the original position while the light waveguide at one side is being inserted in expanded recesses 11 and 21, first and second bodies 10 and 20 clamp down by the elastic force of the bending means. Recesses 11 and 21 that were spaced away from each other by first and second bodies 10 and 20 are then joined together so coated or jacketed regions of the light waveguides 70 at one side are retained, thereby fixing light waveguides 70. Once the light waveguide at one side is fixed, the light waveguide at the other side is then inserted into receptacle 100 in such a manner that both light waveguides 70 are tuned in receptacle 100.

The above first preferred embodiment offers convenience and rapidity in the process of splicing light waveguides.

[Second preferred embodiment]

Figure 4:
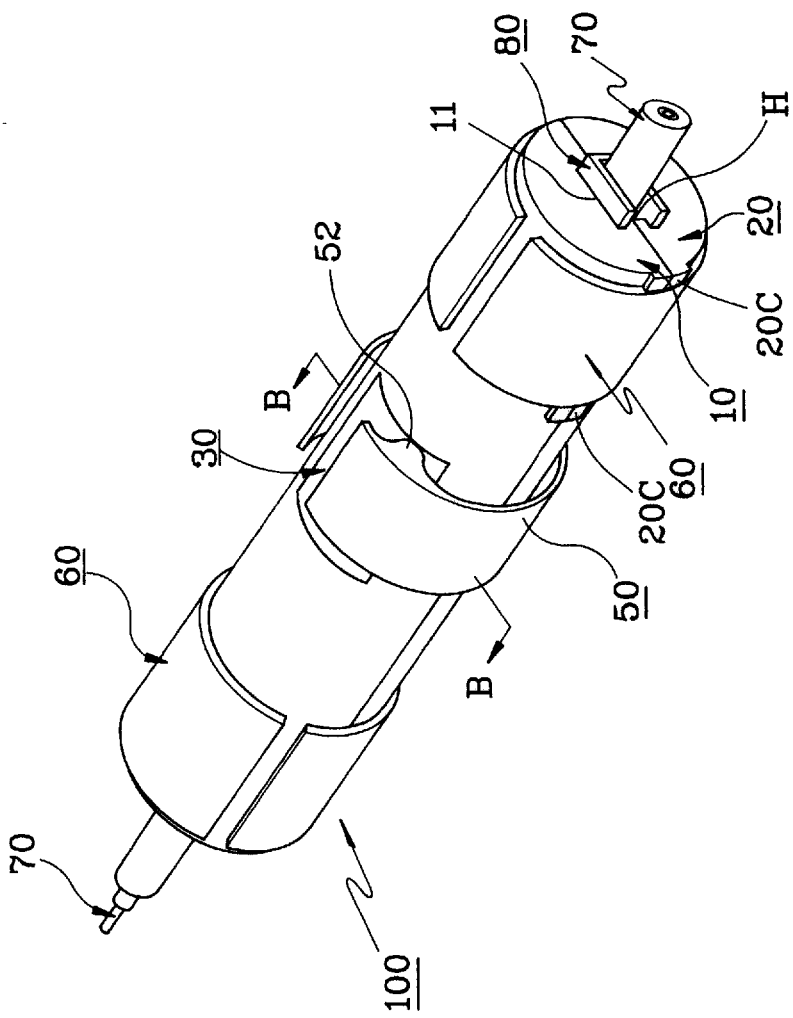
FIG. 4 is a perspective of a splicer for light waveguides in accordance with a second preferred embodiment of the present invention.

FIG. 4 is a perspective view of a splicer for light waveguides in accordance with a second preferred embodiment of the present invention. In the second preferred embodiment, receptacle 100 includes an opening 12 which allows a user to check the connection and tuning of light waveguides 70 with the naked eye.

The splicer for light waveguides of the second preferred embodiment includes a receptacle 100 that consists of a first body 10 and a second body 20, a gripper 30, formed as a part of receptacle 100 to retain cladded light waveguide regions, an spring 40 applying elastic force to gripper 30 outward in a radial direction of receptacle 100, a pressure means 50 giving pressure to gripper 30 to direct gripper 30 into receptacle 100, bending means 60 that are each slid over the outer surface of receptacle 100 longitudinally, and an expanding means 80 used to enlarge the diameter of the recess in order to facilitate insertion of light waveguides.

Figure 5:
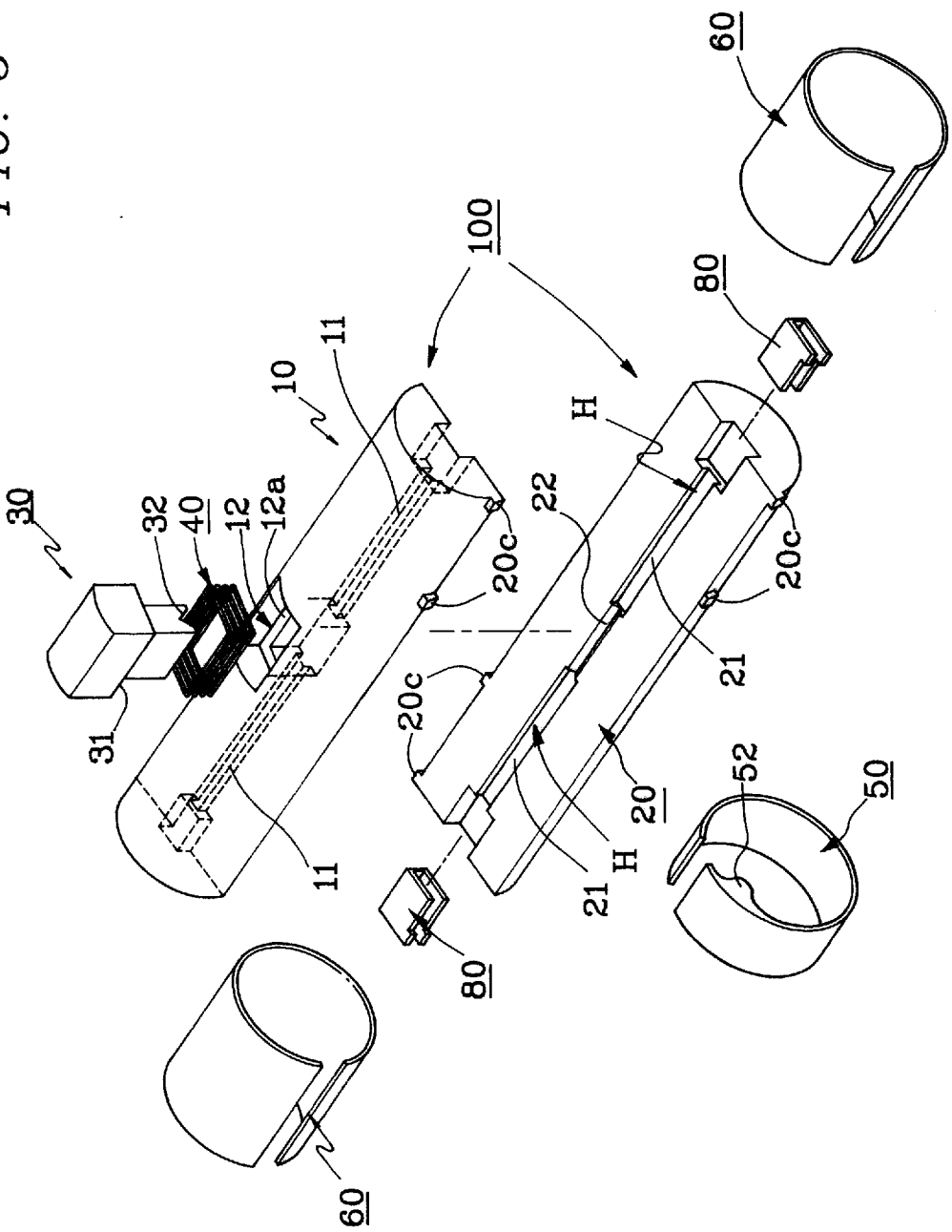
FIG. 5 is an exploded perspective of the splicer for light waveguides of FIG. 4.

FIG. 5 is an exploded perspective view of the splicer for light waveguides of FIG. 4, and shows the respective components of the splicer in accordance with the second preferred embodiment.

As shown in FIGS. 4 and 5, the splicer includes a receptacle 100, pressure means and expanding means that are of the same construction as the first preferred embodiment. The splicer further includes an opening 12 that is cut in first or second body 10 or 20 (on first body 10 in the drawing), gripper 30 inserted into opening 12, and a pressure means that presses the gripper 30 into receptacle 100.

The detailed description about the construction and effect of the second preferred embodiment is omitted because it is the same as the first preferred embodiment.

Opening 12 is formed between recesses 11 of first body 10, and is of size enough to accept gripper 30. Through opening 12 has a shelf 12a inside.

Gripper 30 is inserted into through opening 12, and its top surface is of curvature that is the same as that of first body 10's outer surface. Gripper 30 has a V-shaped groove 32 at the bottom to mate with V-shaped groove 22. When V-shaped groove 22 and V-shaped groove 32 join together, they grip the cladded light waveguides. Gripper 30 includes a portion 31 opposite to shelf 12a in opening 12.

Opening 12 and gripper 30 have polygonal shapes so that gripper 30 does not move in opening 12. Gripper 30 allows light waveguides 70 be accurately located in V-shaped groove 32, and clamps cladded light waveguide regions. A spring applies elastic force to gripper 30 to push it out of receptacle 100. Spring 40 has a diameter smaller than opening 12's. One end of the coil spring is placed on shelf 12a of opening 12, and the other end is placed against gripper 30's portion 31 when gripper 30 is inserted into opening 12.

Pressure means presses gripper 30 downward so that V-shaped groove 32 is pressed against V-shaped groove 22 under a predetermined pressure, thus providing the force of gripping the cladded light waveguides between the V-shaped groove and groove 22 and 32. An elastic clip 50 with elastic force that acts in the radial direction, has a slot cut lengthwise, and a projection 52 extending inward on the inner side that touches receptacle 100. Projection 52 is curved so that it can be easily located or removed from gripper 30's outer surface, and is of width allowing it to be inserted through opening 12. Elastic clip 50 slides onto the middle portion of receptacle 100, covering opening 12. When projection 52 is located on top of gripper 30, gripper 30 is pressed into receptacle 100. The force of the elastic clip exceeds the coil spring's reaction force, thus securely holding gripper 30.

The following description relates to the process of connecting light waveguides according to the second preferred embodiment.

Figure 6A:
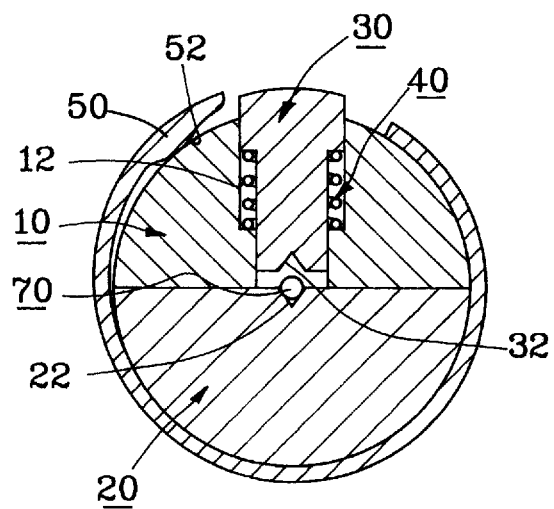
FIG. 6a is a section taken along line B—B of FIG. 4.
Figure 6B:
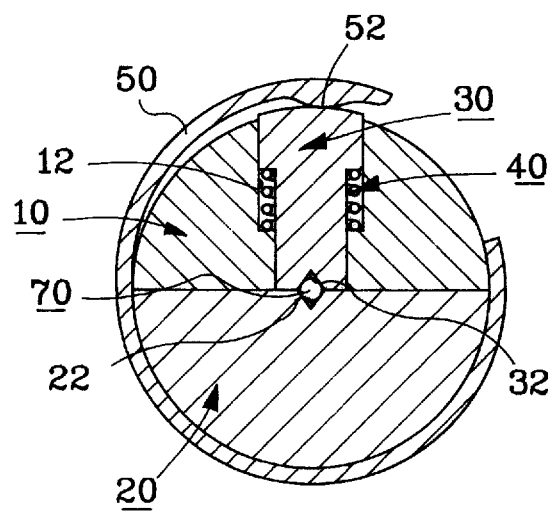
FIG. 6b is a section showing a gripper exposed to outside.

As shown in FIG. 6a, gripper 30's top surface is exposed by rotating or moving elastic clip 50 in the length direction of receptacle 100, and gripper 30, inserted into through opening 12, is then removed therefrom. As shown in FIG. 7b, each hole H is expanded by 90° turning key 80, and light waveguides 70 are inserted into holes H. Light waveguides 70 whose coated layers or jackets are stripped by a length larger than the half length of V-shaped groove 22, are inserted into holes H. When light waveguides 70 are each inserted into holes H, a user may see if both cladded light waveguide regions are appropriately connected or tuned in V-shaped groove 22 via through opening 12 with the naked eye. Once the cladded light waveguide regions are connected with each other, if projection 52 of elastic clip 50 is moved to be put on gripper 30's top surface after inserting gripper 30 into through opening 12, the cladded light waveguide regions are clamped.

Figure 7A:
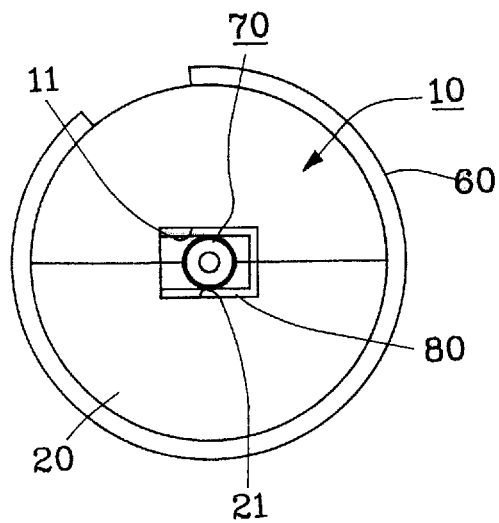
FIG. 7a is a side view showing the connection of light waveguides in accordance with the present invention.
Figure 7B:
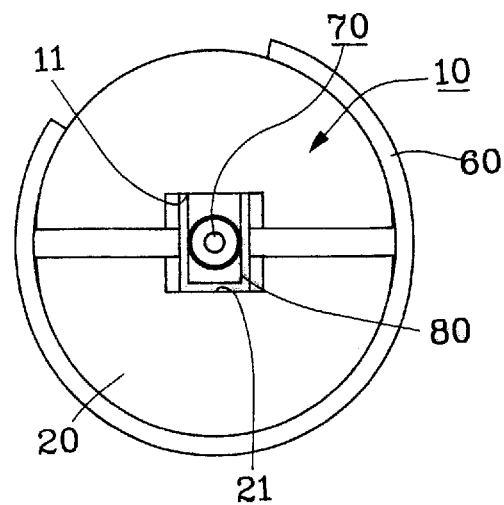
FIG. 7b is a side view showing how a space between the first body and second body is widen by rotating a key for connecting light waveguides.

Referring to FIG. 7a, after tuning the cladded light waveguide regions, key 80 is returned to its original position so that first and second bodies 10 and 20 come in close contact with each other and then join together by the elastic force of ring 60. According to this connecting technique, the cladded light waveguide regions are first clamped and the jacketed light waveguide regions are then clamped.

The above connecting technique may have another order. Another steps of the connecting technique will be described by way of an example.

Light waveguides 70 are inserted into the respective holes H, expanded by 90° rotating keys 80, and a jacketed region of one light waveguide is first clamped by turning only one of keys 80 to its original position. At this point, since the other light waveguide may be freely moved within recess 11 in the axial direction, confirming if the cladded light waveguide regions correctly join together via through opening 12, a user turns the other key 80 to its original position only when both cladded light waveguide regions are correctly tuned, and clamps the jacketed region of the other light waveguide 70.

After inserting gripper 30 into through opening 12 while both light waveguides are being clamped, the cladded light waveguide regions are clamped by moving projection 52 of elastic clip 50 to be on gripper 30's top surface.

According to this connecting technique, the jacketed light waveguide regions are first clamped and the cladded light waveguide regions are then clamped. When the cladded light waveguide regions are favorably connected to each other, small amounts of epoxy resin are applied to the joint of them via through opening 12, thus preventing light loss that may occur at the joint of the light waveguides.

[Third preferred embodiment]

Figure 10:
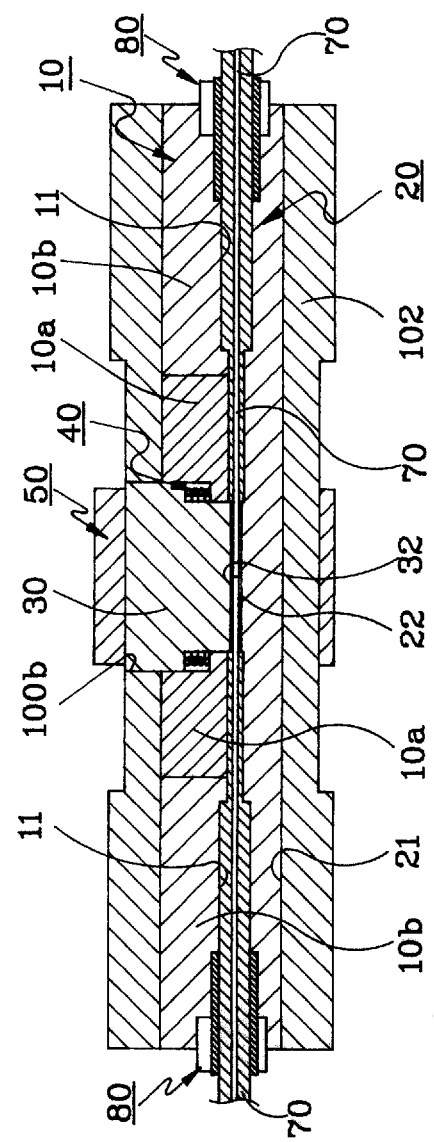
FIG. 10 is a longitudinal cross section of the splicer for light waveguides of FIG. 8.

The third preferred embodiment of the present invention is depicted in FIGS. 8, 9 and 10, wherein a receptacle and a bending means are of different construction.

A receptacle 100 includes a first body 10 having a tuning member 10a and a pair of fixing members 10b, and a second body 20 that consists of a base plate 20a. Tuning member 10a and fixing members 10b are laid on base plate 20a, and are each of semicircular section. Base plate 20a has recesses 11 and 21 and V-shaped groove 22 that are the same as those of the first and second preferred embodiments. Base plate 20a is of width which is the same as tuning member 10a's and fixing members 10b's.

Tuning member 10a is laid on base plate 20a, and serves to clamp cladded light waveguide regions. Fixing members 10b clamp coated or jacketed light waveguide regions. Tuning member 10a has recesses 11 on its bottom that form holes H with corresponding recesses 21 on base plate 20a. Tuning member 10a also has a through opening 12 on its middle and a portion 12a inside through opening 12.

Fixing member 10b is positioned at both sides of tuning member 10a, and tuning member 10a has recesses 11 on its bottom that correspond to recesses 21 to form holes H. Base plate 20a, tuning member 10a, and fixing members 10b are each made of ceramic.

As shown in FIGS. 8 to 10, the bending means of the third preferred embodiment is realized as a bending member 102 having a space 100a into which tuning member 10a, fixing members 10b, and base plate 20a are slidably inserted, and an opening 100b that communicates with through opening 12 of tuning member 10a, and a slot 100c formed extending longitudinally. Bending member 102 includes a pair of apertures 100d, formed outward from bending member 102's center, and space 100a, accepting first and second bodies 10 and 20. This bending member 102 is made of synthetic resin such as polyethylene, polypropylene, etc, and has clamping force that acts inward by slot 100c. Preferably, space 100a is smaller in outer diameter than the circle formed by joining first and second bodies 10 and 20 together.

When first and second bodies 10 and 20 are inserted into space 100a of bending member 102, tuning member 10a, fixing members 10b, and base plate 20a are firmly fixed by the clamping force acting on the interior of space 100a. Through recess 21, formed on tuning member 10a, is exposed to the outside via opening 100b, and an elastic means 40, i.e. coil spring and gripper 30 are inserted into through recess 21.

After taking first and second bodies 10 and 20 out of bending means 102, both light waveguides 70 are aligned in recesses 21 of base plate 20a, and tuning member 10a and fixing members 10b are laid on base plate 20a. Receptacle 100 is then inserted into space 100a of bending member 102 in such a manner that light waveguides 70 are connected with each other from outside and fixed by bending member 102.

Light waveguides 70 are inserted into holes H between base plate 20a and fixing members 10b, expanded in diameter by using keys 80, and a user makes cladded light waveguide regions be clamped, looking into through opening 12 of tuning member 10a to check if light waveguides 70 are correctly aligned in V-shaped groove 22.

When first and second bodies 10 and 20 are spaced away from each other by 90° rotating keys 80, the bending means also spreads out to the outside of its radial direction. As keys 80 return to their original position after inserting light waveguides 70 into expanded holes H, first and second bodies 10 and 20 come in contact with each other by restoring force of the bending means, thus retaining jacketed light waveguide regions inserted into holes H under a predetermined pressure.

According to the third preferred embodiment of the present invention, the bending means surrounds receptacle 100, and even if outside force is applied to receptacle 100 in an axial direction, the contact surface of first and second bodies 10 and 20 does not slide off, thereby keeping Light waveguides 70 tuned in receptacle 100 all the time.

[Fourth preferred embodiment]

Figure 11:
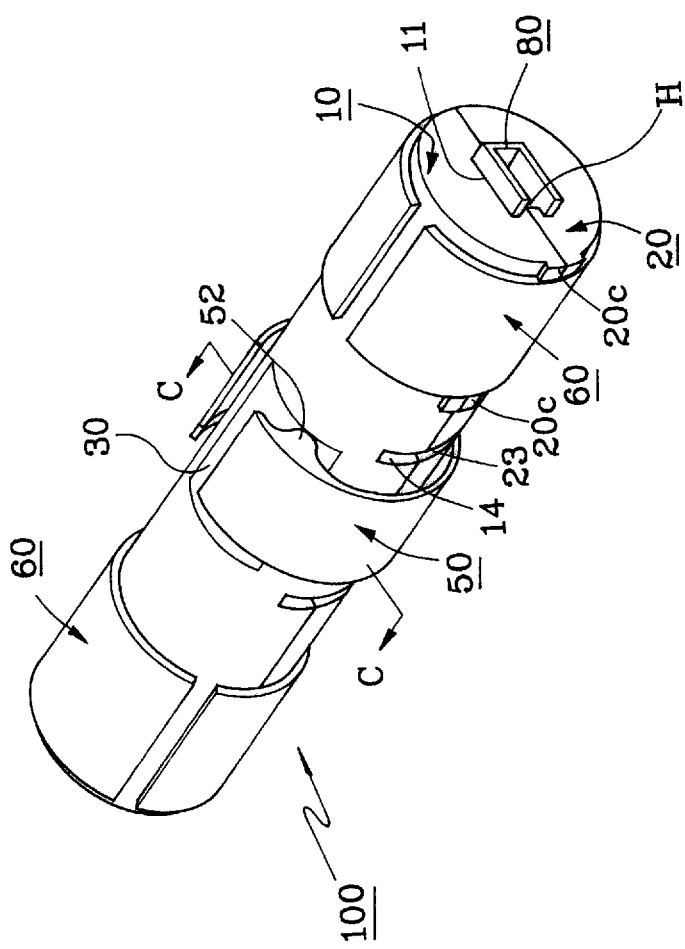
FIG. 11 is a perspective view of a splicer for light waveguides in accordance with a fourth preferred embodiment of the present invention.
Figure 13:
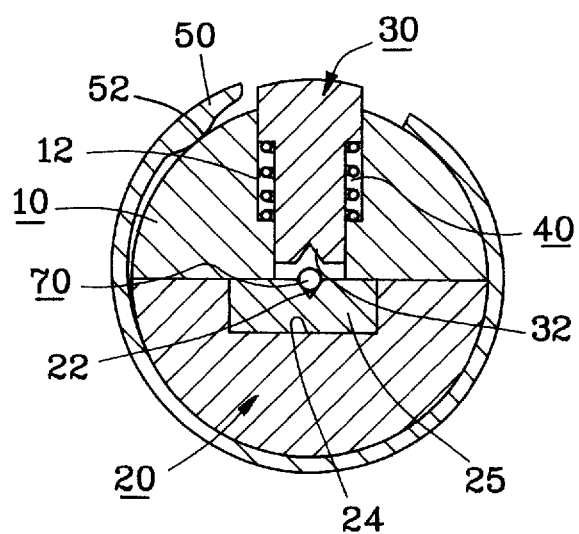
FIG. 13 is a section taken along line C—C of FIG. 11.

The fourth preferred embodiment of the present invention is depicted in FIGS. 11 to 13. A cage 24 is formed to a predetermined depth at second body 20's middle portion, and a platform 25 may be formed to be housed in cage 24. Cage 24 and platform 25 are each modified components for joining together light waveguides inserted into holes H. A V-shaped groove 22a is formed on platform 25's middle portion. The step of joining first and second bodies 10 and 20 together is the same as those of first to third preferred embodiments. Platform 25 is made of rubber, and retains cladded light waveguide regions, flexibly coping with gripper 30's pressing force.

Receptacle 100 may also have cutting parts 14 and 23 that are each formed on middle parts of a contact surface of first and second bodies 10 and 20, i.e. spots adjacent to a through opening 12, extending outward from the center of receptacle 100, as shown in FIGS. 11 and 12. Cutting parts 14 and 23 may be formed on receptacle 100 of each of first to fourth preferred embodiments. When one of keys 80 is 90° rotated, the diameter of one hole H at the rotated key 80's side is enlarged, and the other hole H's diameter is maintained, thus loosening both cladded light waveguide regions that are tuned in holes H. The fourth preferred embodiment is to solve this problem.

First and second bodies 10 and 20, spaced away from each other when turning one of keys 80, are a little bent toward the outside of receptacle 100 at cutting parts 14 and 23, and first and second bodies 10 and 20 are not apart from each other like a trumpet. Therefore, the other light waveguide may be in fixed condition by the bending means as far as one corresponding key 80 is not turned. Accordingly, it is easy to align another light waveguide to the fixed light waveguide 70. The same effect can be expected if cutting parts 14 and 23 are formed on any one of first and second bodies 10 and 20. As shown in FIGS. 8 and 9, an aperture 100d is formed on bending member 102 of the third preferred embodiment to provide the same effect as described above.

In the inventive splicer for light waveguides, a user can see the connecting and tuning conditions of light waveguides via through opening 12 by sliding elastic clip 50 only so as to remove gripper 30 from first body 10, and there is no need to disassemble the splicer. If there is an error in the connection of light waveguides, the tuning of light waveguides is newly controlled by selectively rotating any one of keys 80.

The effect and advantages of the preferred embodiments of the present invention are as follows.

The first preferred embodiment facilitates insertion and tuning of light waveguides in the splicer by the use of the keys, and precludes the misalignment of the light waveguides due to outside force that acts on the splicer in the axial direction.

According to the second to fourth preferred embodiments, when both light waveguides are connected to each other by the splicer, a user can see the connecting state of those light waveguides from outside with the naked eye. Therefore, the second to fourth preferred embodiments offer the prompt and effective process of connecting light waveguides to each other by the splicer. In addition, the second and third preferred embodiments may preclude the misalignment of the light waveguides due to the outside force acting on the splicer in the axial direction.

The first to fourth preferred embodiments allow a user to easily insert or take light waveguides into or out of the splicer by using the keys, without disassembling the splicer. The more correct connection of light waveguides can be realized by double-clamping them.

It will be apparent to those skilled in the art that various modifications and variations can be made in the splicer for light waveguides of the present invention without departing from the spirit or scope of the invention. Thus, it is intended that the present invention cover the modifications and variations of this invention provided they come within the scope of the appended claims and their equivalents.

What is claimed is:

1. A splicer for light waveguides comprising:
   a receptacle including a first body of a predetermined length, having first recesses cut lengthwise through the center of the contact surface, and a second body of length the same as that of the first body, having second recesses cut lengthwise through the center of the surface corresponding to the first recesses cut through the first body;
   expanding means for expanding space separating the first and second bodies in order to easily insert light waveguides into the recesses; and
   bending means surrounding the receptacle's outer surface that securely hold first and second bodies together and provide the necessary clamping force.

2. A splicer for light waveguides according to claim 1, wherein the recesses are cut with multiple stages.

3. A splicer for light waveguides according to claim 1, wherein the expanding means has major and minor axes, and a space through which the light waveguides can pass.

4. A splicer for light waveguides according to claim 1, wherein a pair of pins are formed on the surfaces of the first and second bodies, spaced away from each other.

5. A splicer for light waveguides according to claim 1, wherein the bending means has a slot cut in the longitudinal direction, and forms a ring that compresses the splicer in the radial direction.

6. A splicer for light waveguides comprising:
   a receptacle with a first body of a predetermined length, having recesses cut lengthwise through middle of the contact surface, and an opening right over the middle of the recesses and a second body with the same length as the first body, having the corresponding recesses cut in its contact surface to match with the first body, and a V-shaped groove between the recesses which is coaxial;
   a gripper inserted into the opening, and having the corresponding V-shaped groove that will mate with the V-shaped groove in the second body;
   pressure means pressing the gripper into the opening;
   elastic means for pushing the gripper out of the receptacle;
   bending means for keeping the respective channels of the first and second bodies mated with each other; and
   expanding means for separating the first body from the second body so as to facilitate the insertion of the light waveguides.

7. A splicer for light waveguides according to claim 6, wherein the elastic means is a coil spring with one end positioned on the opening's shelf and the other end is on the corresponding step of the gripper when the gripper is inserted into the opening.

8. A splicer for light waveguides according to claim 7, wherein the pressure means includes a slot cut longitudinally and shaped so that elastic force acts inward in the radial direction.

9. A splicer for light waveguides according to claim 6, wherein the bending means comes in close contact with the outer surface of each of the first and second bodies, and includes a slot cut longitudinally, and forms a ring with elastic force acting inward in the radial direction.

10. A splicer for light waveguides according to claim 1 or 6, wherein the first and second bodies each have a semicircular section.

11. A splicer for light waveguides according to claim 6, wherein the through recess is of polygonal section in order to prevent dislocation of the gripper when the gripper slides into the opening in a direction perpendicular to the central axis of the receptacle.

12. A splicer for light waveguides according to claim 6, wherein the recesses have multiple steps.

13. A splicer for light waveguides according to claim 6, wherein a pair of pins are formed on the outer surface of the first and second bodies, separated from each other by the width of the bending means.

14. A splicer for light waveguides according to claim 6, wherein the expanding means have oval sections.

15. A splicer for light waveguides comprising:
   a receptacle including a second body, formed of a base plate of rectangular section, having recesses with a V-shaped groove cut lengthwise therebetween, and a first body having a tuning member contacting the second body, having an opening positioned perpendicular to the contact surface of the tuning member and the second body, and clamping adjacent to both sides of the tuning member, each having the same section as the tuning member's, and recesses formed on its surface contacting the second body;
   a gripper that is inserted into the opening, and having another V-shaped groove corresponding to the first recesses;

pressure means pressing the gripper into the opening;

elastic means for pushing the gripper out of the receptacle;

bending means having an opening that communicates with the through opening, and used to keep the respective recesses of the first and second bodies matching with each other; and expanding means for expanding the space between the first body and the second body, so as to facilitate the insertion of the light waveguides.

16. A splicer for light waveguides according to claim 15, wherein the bending means includes a space for accepting the receptacle, a slot formed lengthwise, and a bending member having the opening that communicates with the through opening.

17. A splicer for light waveguides according to claim 1, 6 or 15, wherein the receptacle has cutting parts formed extending outward from its center.

18. A splicer for light waveguides according to claim 15, wherein the pressure means is an elastic clip with elastic force acting in the radial direction, having a slot in the longitudinal direction.

19. A splicer for light waveguides according to claim 6 or 15, wherein a projection extending inward is formed on the inside of the elastic clip.

20. A splicer for light waveguides according to claim 1, 6 or 15, wherein a cage is formed with a predetermined depth at the second body's middle portion, and a platform with a V-shaped groove may be inserted into the cage to be coaxial with the recesses.

\* \* \* \* \*